June 4, 1935. D. C. JEFFREY ET AL 2,003,832
WEIGHING AND MIXING MECHANISM
Filed Dec. 21, 1932 7 Sheets-Sheet 1

Inventors,—
Douglas C. Jeffrey and
Henry J. Wolfe,
By Fricke & DeBusk,
attorneys.

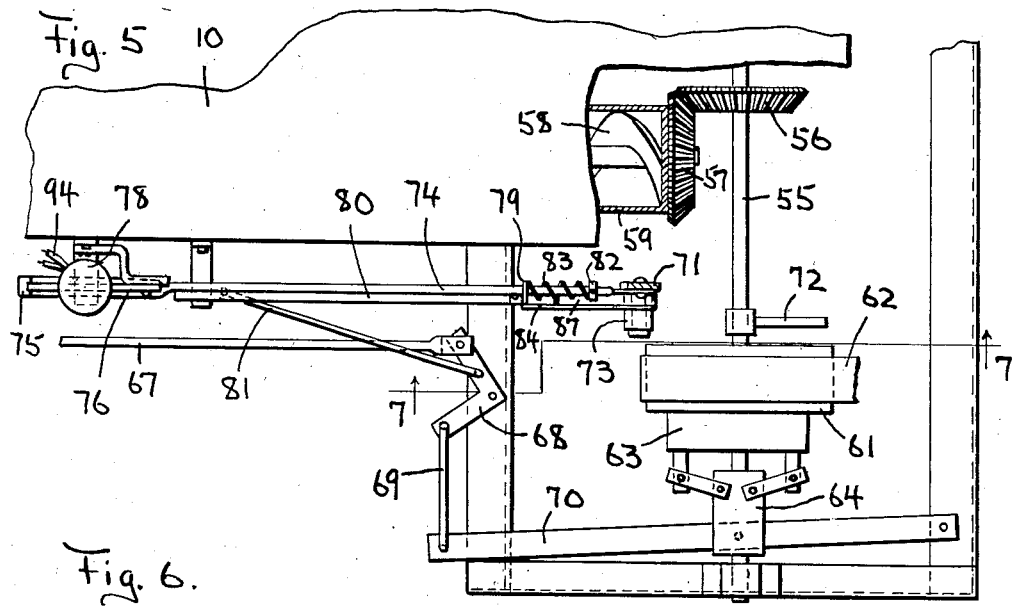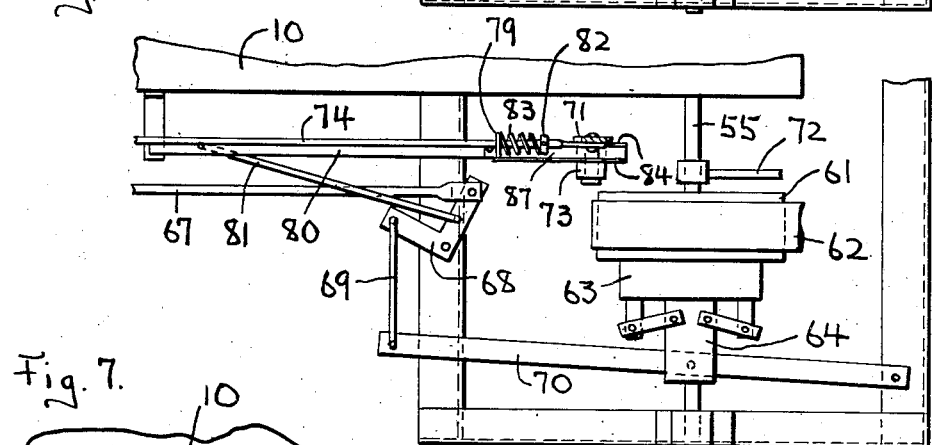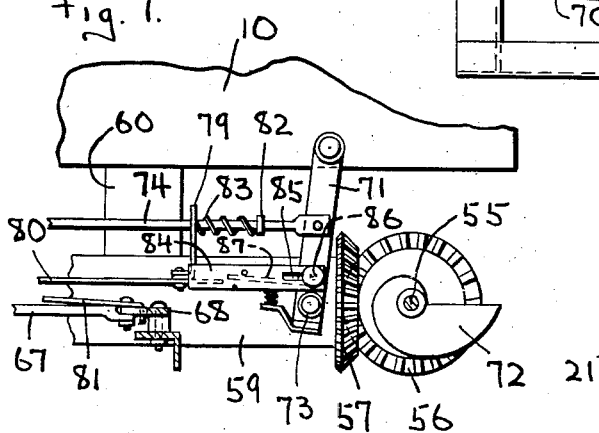

June 4, 1935. D. C. JEFFREY ET AL 2,003,832
WEIGHING AND MIXING MECHANISM
Filed Dec. 21, 1932 7 Sheets-Sheet 3
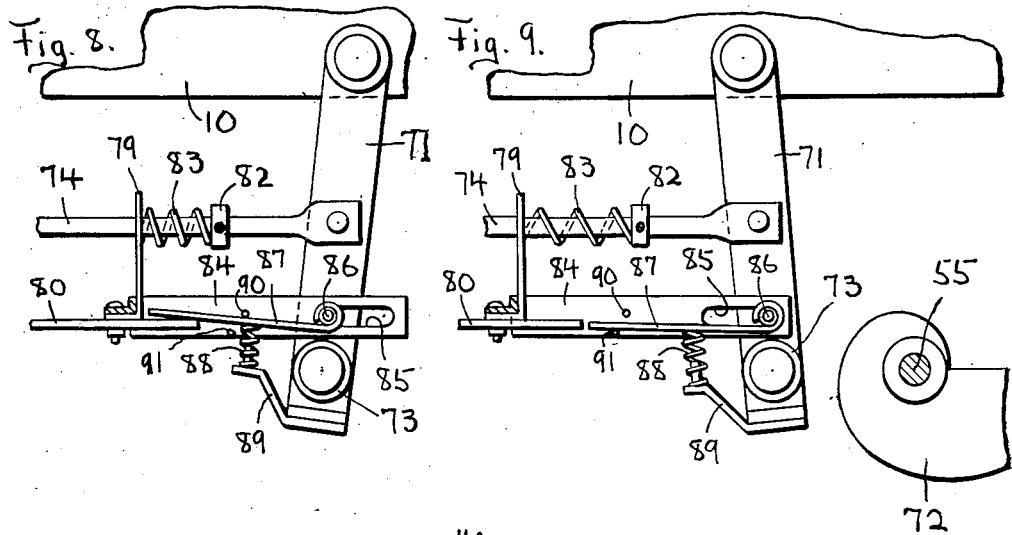
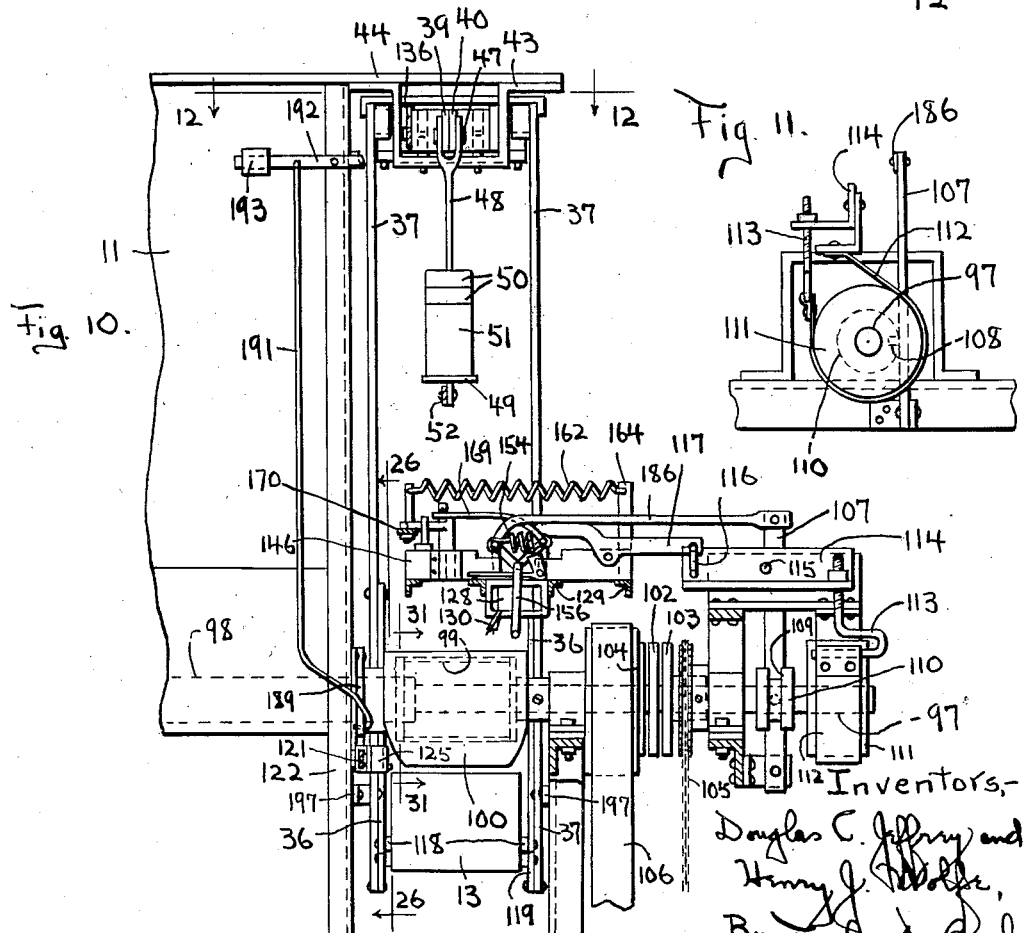

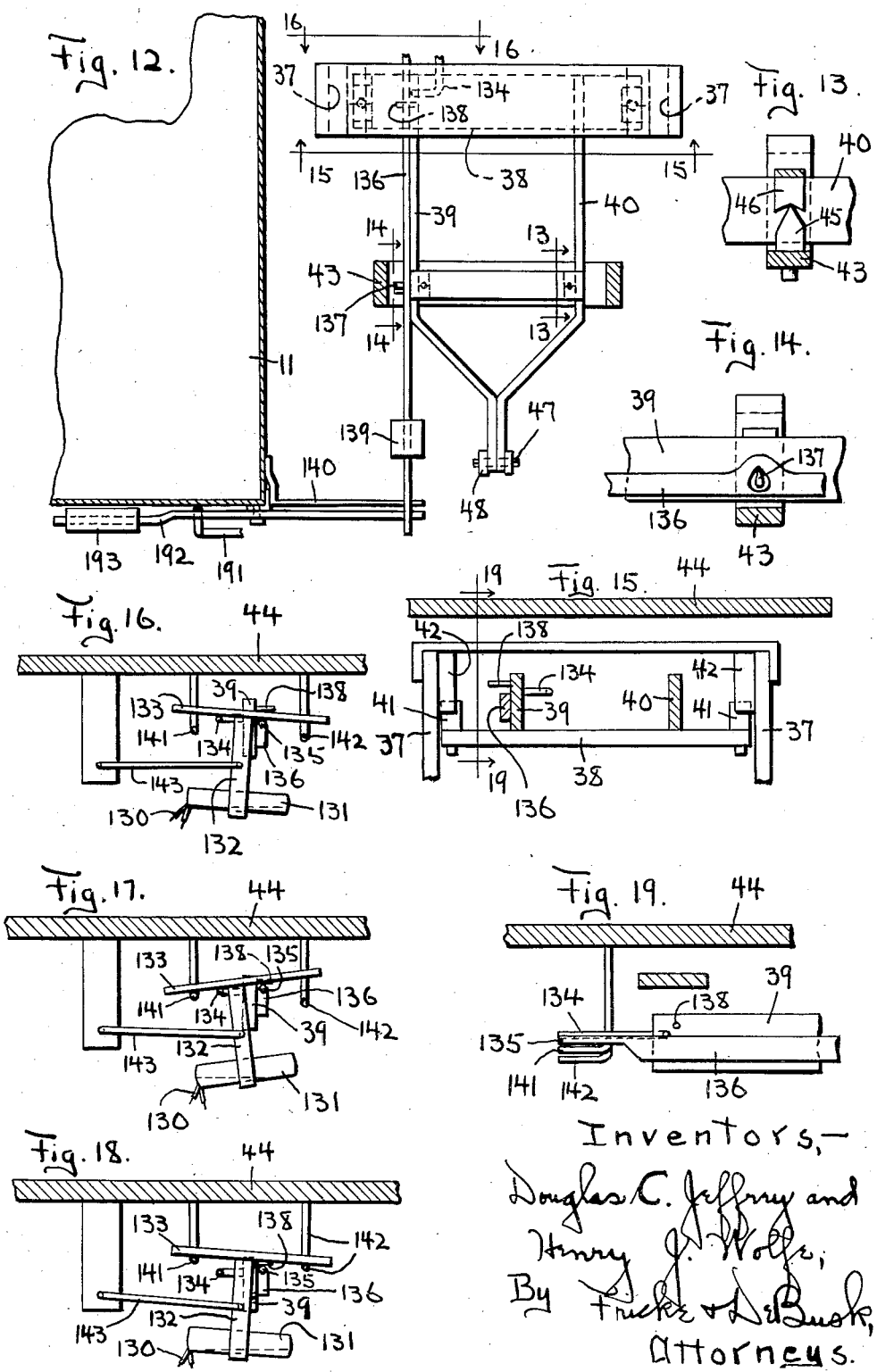

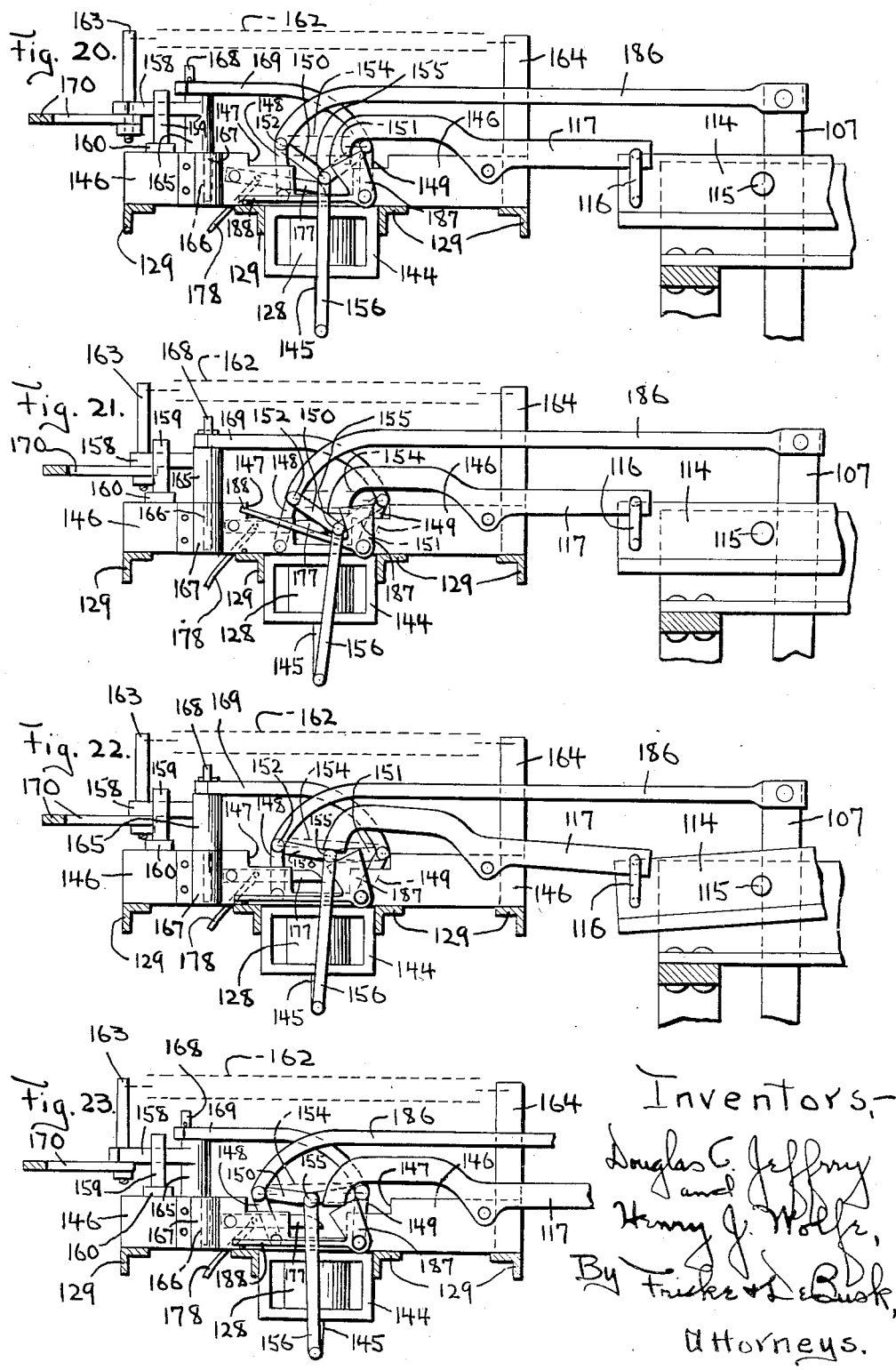

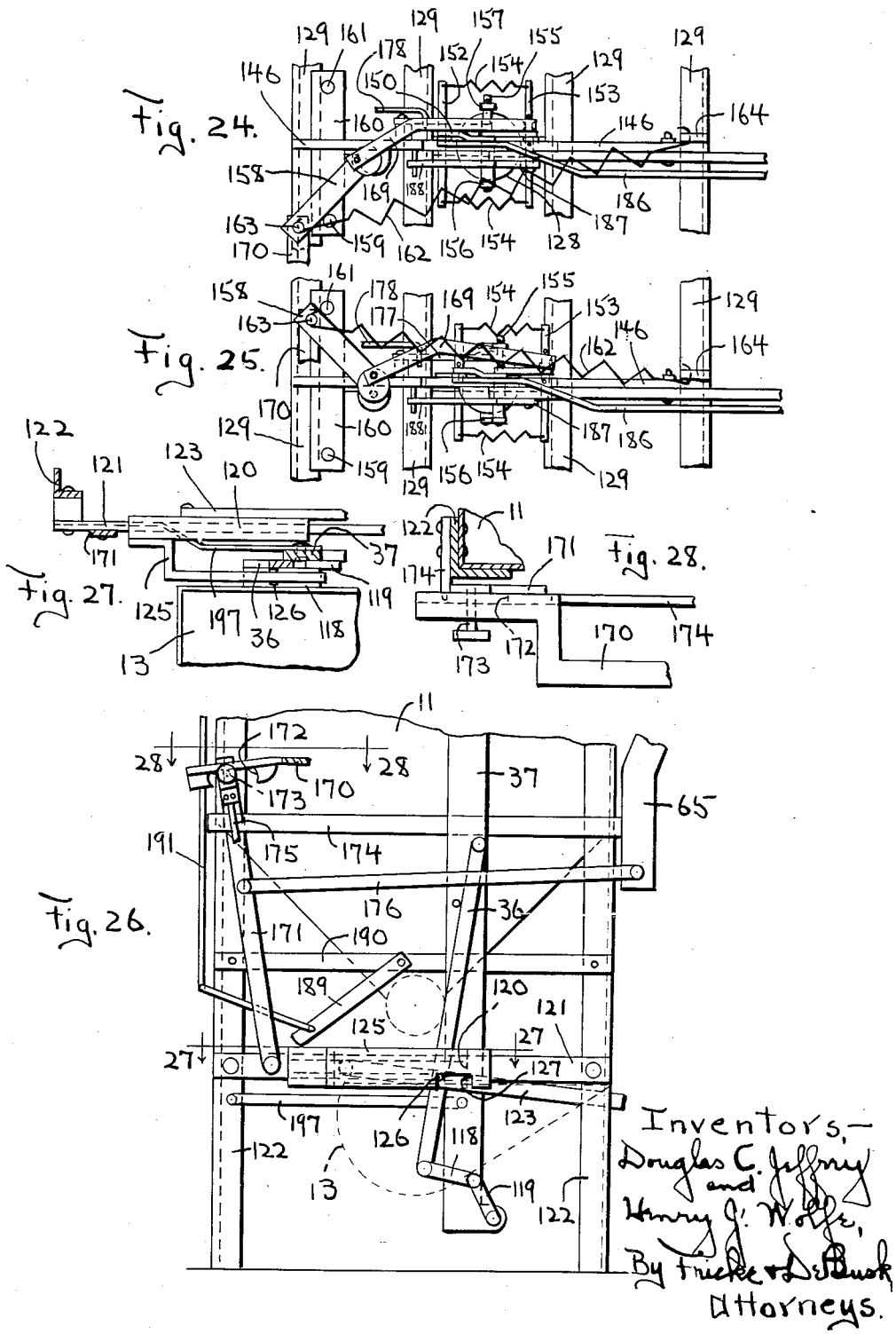

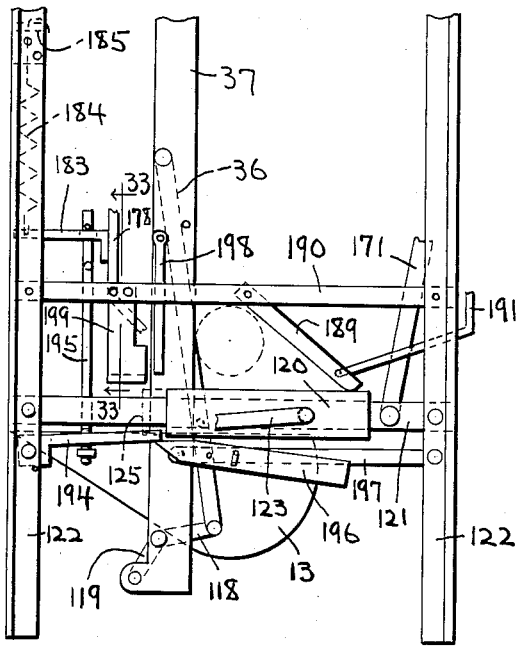
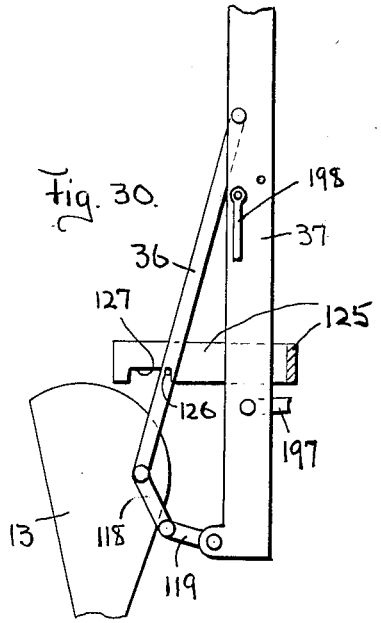
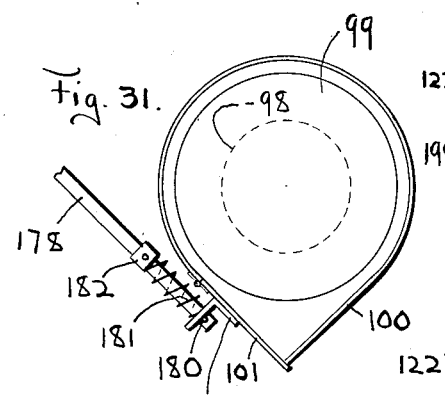
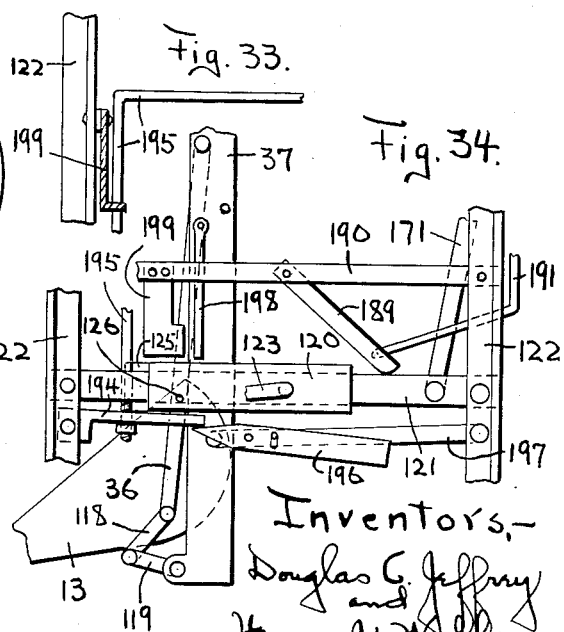
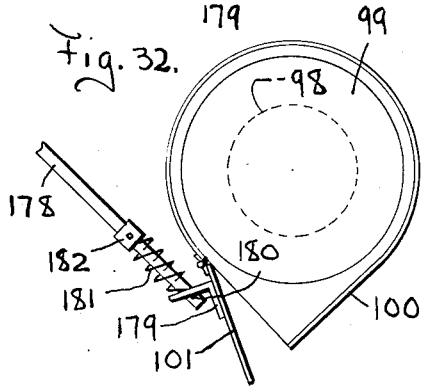

Patented June 4, 1935

2,003,832

UNITED STATES PATENT OFFICE 2,003,832

WEIGHING AND MIXING MECHANISM

Douglas C. Jeffrey and Henry J. Wolfe, Akron, N. Y., assignors to Universal Gypsum & Lime Co., Chicago, Ill., a corporation of Delaware Application December 21, 1932, Serial No. 648,180

22 Claims. (Cl. 249—22)

Our invention relates to weighing and mixing mechanisms, and it has for its object the provision of a new and improved form and arrangement of parts by which the proportioning of the ingredients of a desired mixture may be controlled automatically and accurately. The embodiment of our invention as shown in the drawings is for use for the preparation of gypsum plaster in which the ratio between the stucco and the retarder must be kept uniform and true to specification if anything like satisfactory results are to be had in the use of the plaster.

As is well understood by those skilled in the art, when finely ground stucco is being delivered from the discharge chute at the bottom of a hopper, it is practically impossible to control the delivery accurately, and particularly when additional supplies of stucco are at the same time being dumped into the hopper at the top so as to vary greatly the pressure of the stucco at the discharge opening. The difficulty is even more pronounced when the stucco is delivered to the hopper from the calcining cylinder before complete cooling of the stucco. We have found in practice in connection with a screw conveyor for controlling the feed of stucco from the hopper that in many instances the stucco continues to flow through the screw for many seconds after the screw has been silenced, even when the screw extends horizontally a considerable distance from the point of delivery of the stucco to the screw so as to necessitate that the stucco move through a considerable number of complete turns about the silenced screw in order to escape. We have found in connection with a hopper provided with two screw conveyors adapted normally to deliver 1400 pounds of stucco upon each 50 to 60 rotations of the screws that in the majority of cases 100 pounds or more of excess stucco are delivered after the stoppage of the screws, that in many cases 300 to 500 pounds of excess stucco are delivered, and that in some cases as much as 900 to 1000 pounds of excess stucco are delivered.

It is one of the objects of our invention to provide an improved arrangement of mechanism comprising two containers operatively connected together so as to be movable vertically with respect to each other in a counterbalancing relationship whereby said containers have vertical movement with respect to each other when the ratio of the weights in the two containers passes a predetermined critical value, means being provided preferably for effectively shutting off delivery to said containers when the desired weight ratio has been reached. It is one of the objects of our invention to provide an arrangement of this type in which each of the containers is supported from a scale beam mechanism, and in which means is provided for automatically shutting off delivery to each container when a certain predetermined weight of materials has been delivered to the container.

It is one of the objects of our invention to provide an arrangement of this type comprising adjustable connections between the scale beams whereby the weight ratio may be changed readily and quickly when desired.

It is another object of our invention to provide means for automatically stopping the operation of the mechanisms for feeding materials to the respective counterbalanced containers, the feeding mechanism for one of said containers being stopped when the materials in the container reach a predetermined maximum weight, and the feeding mechanism for the other container being stopped when the materials in such other container are brought to the predetermined desired weight relationship to the materials actually delivered to said one container, whether such materials approximate in weight the predetermined desired maximum or otherwise. It is one of our objects to provide an arrangement of this type by which delivery of approximately the normal full amount of materials is made to one of the containers, by which the full amount of materials is then delivered to the other container, and by which an additional amount of materials is then delivered to said one container for establishing the desired weight ratio, such delivery of additional materials to said one container being preferably effected slowly so as to make it readily controllable for regulating accurately the amount delivered and thus making possible an accurate control of the desired weight ratio.

It is one of the objects of our invention to provide an arrangement of the type described in which means is provided adapted normally to prevent dumping of the contents of one or both of the containers until at least an approximately accurate weight ratio has been established.

It is another object of our invention to improve mechanisms of this type in sundry details hereinafter pointed out. The preferred means by which we have accomplished our several objects are illustrated in the drawings and are hereinafter specifically described. That which we believe to be new and desire to cover by Letters Patent is set forth in the claims.

In the drawings, which are shown more or less diagrammatically, and particularly with respect to features which are well-known and well understood in the art,—

Fig. 5 is a top view of the clutch and co-operating parts by which the feeding means for the container adapted to receive stucco is driven, certain of the parts being broken away for clearness of illustration;

Fig. 6 is a view of a portion of the parts shown in Fig. 5 but illustrating a changed position of the parts;

Fig. 7 is substantially a vertical cross section taken at line 7—7 of Fig. 5;

Fig. 8 is a view upon an enlarged scale of a portion of the parts as shown in Fig. 7, but showing a changed position of the parts;

Fig. 9 is a view similar to Fig. 8 but showing a third operative position of the parts illustrated;

Fig. 10 is a view showing the clutch mechanisms and certain of the cooperating parts by which materials are fed to the smaller counterbalanced container which in the construction illustrated is provided for retarder, such view being taken at approximately the line 10—10 of Fig. 1;

Fig. 11 is a view of the parts at the right of Fig. 10 as seen from the right in said Fig. 10;

Fig. 12 is a top plan view of a portion of the counterbalancing means for the smaller container, being substantially a section taken at line 12—12 of Fig. 10;

Figs. 13, 14 and 15 are vertical sections taken respectively at the line 13—13, the line 14—14, and the line 15—15, of Fig. 12, Fig. 15 showing also the top plate extending above the parts shown in Fig. 12 and omitted from Fig. 12 for clearness of illustration;

Fig. 16 is a view toward the end of one of the counterbalancing bars as shown in Fig. 12, substantially as seen at the line 16—16 of Fig. 12;

Figs. 17 and 18 are views similar to Fig. 16 but showing changed positions of the parts;

Fig. 19 is a vertical section at line 19—19 of Fig. 15, showing certain of the parts as seen from the right in Fig. 16, but with certain other parts omitted for clearness of illustration;

Fig. 20 is a view of certain of the operating parts as shown in Fig. 10 but upon an enlarged scale, showing certain of the parts diagrammatically;

Figs. 21, 22 and 23 are views similar to Fig. 20 but showing changed positions of the parts;

Fig. 24 is a top plan view of a portion of the parts as shown in Fig. 20;

Fig. 25 is a view similar to Fig. 24 but showing a changed position of the parts;

Fig. 26 is a vertical section taken at line 26—26 of Fig. 10 but upon a slightly enlarged scale;

Figs. 27 and 28 are horizontal cross sections taken at the line 27—27 and the line 28—28 respectively of Fig. 26;

Fig. 29 is a view similar to Fig. 26 but showing the parts from the opposite side, and with some parts shown in Fig. 29 which are omitted in Fig. 26;

Fig. 30 is a detail view similar to a portion of the showing of Fig. 29 but illustrating a changed position of the parts;

Fig. 31 is a diagrammatic view showing certain of the parts as taken at line 31—31 of Fig. 10;

Fig. 32 is a view similar to Fig. 31 but showing a changed position of the parts;

Fig. 33 is a vertical section of certain of the parts as shown at line 33—33 of Fig. 29; and Fig. 34 is a view similar to a portion of Fig. 29 but showing a changed position of the parts.

Figures 2, 3:
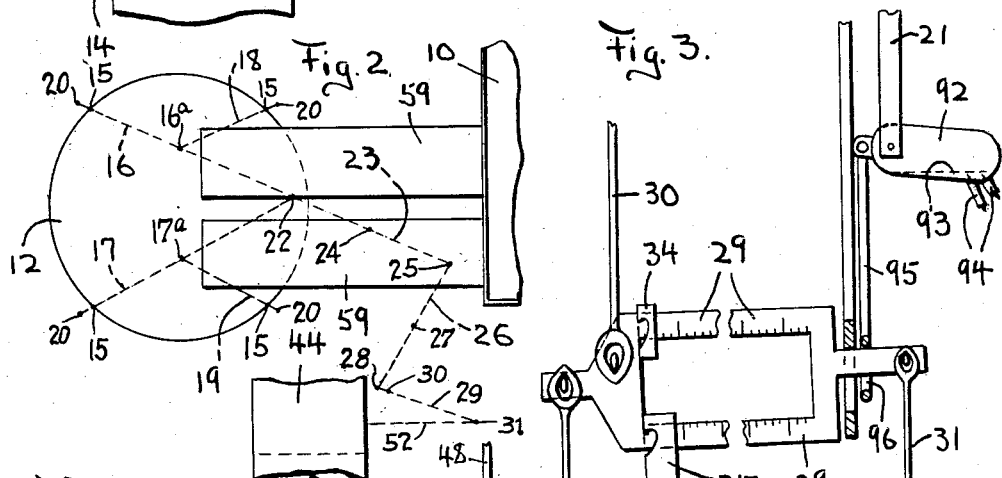
Fig. 2 is a top plan view of a portion of the parts shown in Fig. 1.
Fig. 3 is an enlarged detail view, with certain of the parts broken away for clearness of illustration, showing the operative connections between the counterbalancing mechanisms for the two containers.

Referring to the several figures of the drawings in which corresponding parts are indicated by the same reference characters, 10 indicates a hopper adapted to contain stucco, 11 a hopper adapted to contain commercial retarder, 12 a container also in the form of a hopper into which a quantity of stucco is adapted to be delivered from the hopper 10, 13 a comparatively much smaller container to which a quantity of retarder is adapted to be delivered from the hopper 11, and 14 a mixer of any approved type to which the retarder and stucco are delivered from the containers 12 and 13 for the desired mixing operation. In the arrangement shown, the container 12 is suspended from and supported by a plurality of links 15 which are connected at their upper ends to horizontally disposed levers 16, 17, 18 and 19 which in turn are supported from above by links 20 depending from a frame-work 21 and a link 22 connected with a lever 23. The ends of the levers 16 and 17 are connected with the levers 18 and 19 respectively by short vertically extending links 16a and 17a. The lever 23, in the arrangement shown, is supported at its middle point by a link 24 depending from the frame-work 21, with a link 25 extending downwardly from the end opposite that to which the link 22 is connected, the link 25 being connected at its lower end with a lever 26 which is pivoted at its central point upon a frame support 27 indicated diagrammatically by a dotted line. The opposite end of the lever 26 from that to which the link 25 is connected, has a connection by means of a link 28 with a scale beam 29 which in the arrangement shown is in the form of a double bar (see Fig. 3), such scale beam 29 being suspended from a link 30 from a suitable portion of the framework. The depending weight carrier 31 is also in the form of a link provided with a plate 32 at its lower end for receiving a plurality of weights 33. As shown in Fig. 3, each of the bars of the scale beam 29 is provided with a slidably mounted weight in the usual form, the two weights being indicated by the numerals 34 and 35 respectively. The bars upon which the weights 34 and 35 are mounted are graduated in the well-known manner.

The smaller container 13 is in the form of a scoop which is adapted to be tilted for emptying it, being pivotally mounted upon two links 36 which in turn are pivotally mounted on upright bars 37. The bars 37 in turn are pivotally mounted upon a horizontally disposed bar 38, as is best shown in Fig. 15, which bar 38 is fixedly mounted upon the end portions of oppositely disposed bars 39 and 40, the pivotal connection with the bars 37 being effected through the medium of knives 41 cooperating with grooved blocks 42.

At their middle points, the bars 39 and 40 are pivotally supported from a yoke 43 which is connected with a heavy plate 44 forming the top wall of the hopper 11, such plate 44 being extended beyond the hopper at one end, as is clearly shown in Fig. 10. The pivotal connection between the bars 39 and 40 and the yoke 43 is effected through the medium of knives 45 and grooved blocks 46 as is clearly shown in Fig. 13. At their opposite ends, the bars 39 and 40 are offset inwardly toward each other, as is clearly shown in Fig. 12, such ends being connected by means of a knife 47 with a weight supporting member 48 in the form of a link as best shown in Fig. 10, such link 48 being provided with a plate 49 thereon at its lower end for supporting a plurality of weights 50 thereon.

The arrangement of the hopper 12 and the train of levers and links by which it is connected with the scale beam 29 is such that the hopper is supported in counterbalanced relation to the weights 33 carried by the link 31. In the arrangement shown, the relationship is 200 to 1, so that weights 33 having an actual weight of 7 pounds are adapted to counterbalance 1400 pounds of stucco in the hopper 12. The train of levers and links as shown is merely illustrative of one arrangement by which the desired counterbalanced relation is effected between the scale beam 29 and the hopper 12; any desired arrangement may be employed. The arrangement of the container 11 and its counterbalancing levers and connections is such that a pound of retarder in the scoop 13 is adapted to balance a pound weight 50 on the link 48. In the arrangement shown, a weight 51 is mounted upon the link 48 for counterbalancing the operating mechanism for establishing the 1 to 1 relation. As is clearly shown in Fig. 3, the lower ends of the links 31 and 48 are pivotally connected together by means of a link 52 which is arranged to bear at an intermediate point against a knife edge device 53 which is adjustably mounted upon a horizontally disposed bar 54 fixedly mounted in position upon any suitable portion of the frame-work. The arrangement is such that when the weights 33 and 50 are standing in their lowered positions the bar 52 is out of engagement with the knife edge device 53. When, however, materials have been added to the hopper 12 for raising the weights 33 as shown in Fig. 3, or materials have been added to the scoop 13 for raising the weights 50 to their uppermost position, under such circumstances the bar 52 is brought into engagement with the knife edge device 53. The arrangement is such that the links 31 and 48 cannot stand in their uppermost positions at the same time. With the scale bar 29 in its raised position by reason of a quantity of materials in the hopper 12, the link 48 is not able to rise to its uppermost position until the materials in the scoop 13 exert sufficient pressure upon the link 48 for drawing the link 48 upwardly against the upward pull on the link 31. With the knife edge device 53 at its mid point between the points of connection of the bar 52 with the links 31 and 48, the effective weight relationship between the containers 12 and 13 is in the arrangement above described 200 to 1. When, however, the knife edge device 53 has been shifted along the bar 54 to a changed position for changing the leverage of the bar 52 considering the knife edge device as the fulcrum, the relationship may be made either less or greater than 200 to 1, and by movement of the knife edge device 53 to the required position therefor the ratio may be regulated as desired. In the arrangement shown, the bar 54 is graduated for indicating the different positions of the knife edge device 53 for effecting the different desired weight ratio relationship between the containers 12 and 13.

By the arrangement as above described, it will be appreciated that with weights 33 on the link 31 representing 7 pounds so as to require 1400 pounds of stucco in the hopper 12 for counterbalancing, and with weights 50 on the link 48 weighing 4 pounds for counterbalancing 4 pounds of retarder in the receptacle 13, and with the knife edge device 53 in such position that a 7 pound upward pull on the link 31 counterbalances a 4 pound upward pull on the link 48, the mechanism is in condition for use for weighing out ingredients at a ratio of 1400 to 4. If an excess weight of stucco should be fed to the hopper 12, and if then 4/1400 of such excess weight of retarder should be added to the scoop 13, the two containers 12 and 13 would be brought to balanced condition with respect to each other through the bar 52 even though each of said containers were out of balance with respect to the weights 33 and 50.

In the construction illustrated, a drive shaft 55 is provided extending underneath the hopper 10, connected by means of bevel gears 56 and 57 with worm conveyors 58 one of which is shown in Fig. 5. The worms 58 operate in troughs 59 which extend along underneath the hopper 10 for receiving stucco from the hopper through chutes 60, the troughs 59 standing at their outer ends above the hopper 12 for emptying thereinto. A driving pulley 61 is revolubly mounted upon the shaft 55 (see Fig. 5), being driven from any suitable source of power by means of a belt 62. A clutch mechanism 63 of any suitable type is provided for connecting the shaft 55 with the drive pulley 61, the clutch as illustrated comprising a slide block 64 through the medium of which the clutch is thrown into and out of operation. In the arrangement shown, when the slide block 64 is moved toward the driving pulley 61, the clutch is made operative for driving the shaft from the pulley. When the slide block 64 is moved outwardly away from the pulley 61 into the position as shown in Fig. 5, the clutch is thrown out of operation. The arrangement is such that when the clutch is thrown into operation by movement of the slide block 64 toward the pulley 61 into the position as shown in Fig. 6, the clutch is normally held in operation until the slide block 64 is moved outwardly by a force supplied thereto independently of the clutch.

In the arrangement shown, the means for throwing the clutch into and out of operation comprises a lever 65 pivotally mounted upon a bracket 66 mounted upon the hopper 11, such lever having a link 67 pivotally connected therewith so as to be movable by the lever toward and from the shaft 55. At a point adjacent to the shaft 55 (see Figs. 5, 6 and 7), the link 67 is pivotally connected with a bell crank lever 68 which is pivotally mounted upon the frame-work so as to swing horizontally. The bell crank lever 68 is connected by means of a link 69 with an operating lever 70 which is pivotally connected with the slide block 64. The arrangement is such that when the lever 65 is moved in clockwise direction in Fig. 1 the link 67 is moved toward the shaft 55 and the clutch 63 is thrown into operation.

The means for throwing the clutch out of operation comprises a pivotally mounted arm 71 extending downwardly adjacent to the shaft 55 adapted to cooperate with a cam 72 fixedly mounted upon the shaft 55 in position to engage a roller 73 carried by the arm 71. The arm 71 is pivotally connected at an intermediate point with a link 74 which extends along the side of the hopper 12. At its end removed from the shaft 55, the link 74 is provided with a block 75 against which a pivoted dog 76 is adapted to bear for preventing movement of the link 74 toward the shaft 55. The dog 76 is pivotally mounted upon a suitable portion of the framework, being connected at an intermediate point with an armature 77 of an electro-magnet 78. When the magnet is energized, the armature 77 is drawn upwardly releasing the dog 76 from the link 74 so as to permit such link to move toward the right in Figs. 4 and 5. At the end portion of the link 74 adjacent to the arm 71, the link 74 extends through an opening in a bracket 79 which is rigidly connected with a slide bar 80 which is connected by means of a link 81 with the bell crank lever 68, as is clearly shown in Figs. 5 and 6. The link 74 is provided at a point between the arm 71 and the bracket 79 with a collar 82 which serves as a bearing for a spring 83 interposed between the collar and the bracket 79. The arrangement is such that when the link 67 is moved toward the right into the position as shown in Fig. 6 for throwing the clutch into operation while at the same time the dog 76 is holding the link 74 from movement toward the right in Figs. 5 and 6, the spring 83 is compressed as indicated by a comparison of Figs. 5 and 6. When thereafter the dog 76 is released, the spring 83 serves to move the arm 71 toward the shaft 55, into the position as shown in Fig. 9.

Figure 4:
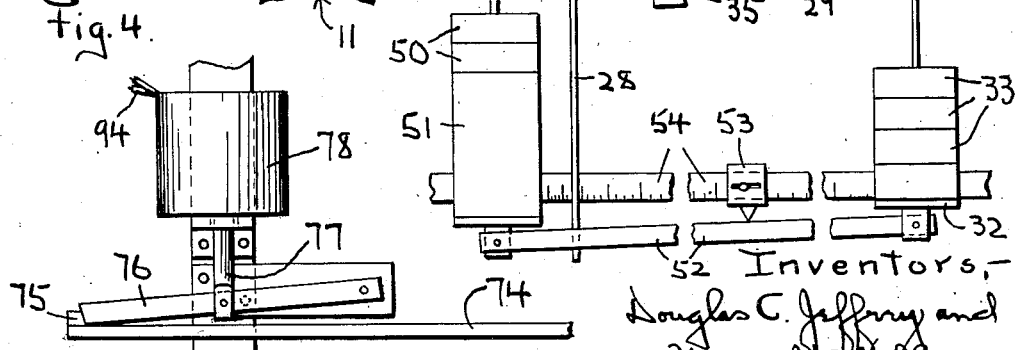
Fig. 4 is an enlarged detail view, being a side view of the magnet and connected dog employed in connection with the means for throwing out of operation the clutch by which the feeding means for one of the containers is driven.

At its end portion adjacent to the shaft 55, the slide bar 80 is provided with two plates 84 rigidly connected thereto, such plates 84 being provided with slots 85 therein (see Figs. 8 and 9), connected by means of a pin 86 with the arm 71. By reason of the provision of the slots 85, upon the movement of the arm 71 toward the shaft, the slide bar 80 is permitted to remain in unchanged position. Upon such movement of the arm 71 toward the shaft 55, a pawl 87 pivotally mounted upon the pin 86 is moved toward the right from the position as shown in Fig. 8 to the position as shown in Fig. 9 opposite the end of the slide bar 80. When the parts are in the position as shown in Fig. 8, a spring 88 carried by a bracket 89 mounted upon the arm 71 by upward pressure on the pawl 87 lifts such pawl into engagement with a pin 90 as shown in said Fig. 8 so as to stand above the end of the slide bar 80. When the arm 71 is moved toward the right, however, into the position as shown in Fig. 9, the changed angular position of the bracket 89 permits the pawl 87 to move downwardly into engagement with a pin 91 so as to stand opposite the end of the slide bar 80. With the parts in the position as shown in Fig. 9, and with the shaft 55 being driven in clockwise direction, the cam 72 serves by engagement with the roller 73 to force the arm 71 toward the left from the position as shown in Fig. 9. Upon this movement of the arm 71 toward the left, the pawl 87 by engagement with the slide bar 80 moves the slide bar 80 toward the left, serving through the link 81 to swing the bell crank lever 68 in counter-clockwise direction from the position as shown in Fig. 6 to that shown in Fig. 5, serving thus to throw the clutch 63 out of operation and thus to stop the rotation of the feeding devices 59. Upon this operative movement of the arm 71 by the cam 72 away from the shaft 55, the spring 83 is, of course, moved bodily toward the left between the collar 82 and the bracket 79 without compression. Upon the movement of the arm 71 toward the left in Figs. 8 and 9, the link 74 is moved at the same time toward the left so as to bring the block 75 again into position to be engaged by the dog 76 as shown in Figs. 4 and 5. The arrangement is such that the link 74 is held by its operative connection with the clutch in the position as shown in Figs. 4 and 5 whether or not the dog 76 has been lowered again into operative engaging position following its last preceding operative upward movement by the magnet 78.

Means is provided for automatically throwing the feeding devices 59 out of operation when a certain predetermined amount of materials has been fed to the container 12. This means comprises a mercury switch 92 pivotally mounted in position upon any suitable part of the framework 21 above the scale beam 29, as is clearly shown in Fig. 3. The switch 92 is in the form of a glass bulb or other container holding a quantity of mercury 93 therein in such relation that, when the container stands in the position as shown in said Fig. 3, a circuit is completed through the leads 94 of an electric circuit by which the magnet 78 is connected with a suitable source of electrical energy. The container 92 is adapted normally to stand in operative circuit closing position as shown in Fig. 3, but is adapted to be swung in counter-clockwise direction in said Fig. 3 so as to cause the mercury to shift in position for opening the circuit 94 upon a downward pull upon a connected link 95, the lower end of which is provided with a loop 96 embracing the end of the scale bar 29. The arrangement is such that when the scale bar 29 stands in its lowered position, as when the hopper 12 is empty, the switch 92 is held open by the link 95. When however, stucco has been fed to the hopper 12 so as to cause the weights 33 to be counterbalanced thereby, the scale bar 29 rises for moving the switch into the position as shown in said Fig. 3 for closing the circuit 94. When the weight of the stucco delivered to the hopper 12 reaches the predetermined maximum weight as determined by the number of weights 33 on the link 31, the circuit through the magnet 78 is closed and the pawl 76 is lifted for permitting the link 74 to move toward the right in Fig. 4 as above described for initiating the action by which the clutch 63 is thrown out of operation and the feed of the stucco by the feeding devices 59 is stopped.

The means for feeding retarder from the hopper 11 to the scoop 13 comprises a shaft 97 (see Fig. 10), which has connected thereto a screw 98 in the lower end portion of the hopper, such screw feeding device being of any approved type adapted by rotation to carry retarder from the hopper 11 and deliver it toward the right in said Fig. 10. In the construction shown, a rotary screen device 99 is mounted upon the shaft 97 so as to rotate therewith within a housing 100 arranged opposite said hopper 11, the feeding screw 98 being adapted to deliver the retarder to the interior of the screen 99 from which the retarder escapes by a sifting action through the wall so as to drop into the scoop 13. The housing 100 is provided with a closure flap 101 pivotally mounted thereon at the bottom thereof for stopping definitely the delivery of retarder from the rotary screen to the scoop 13 in the desired timed relation regardless of any sifting of retarder through the screen after the rotation of the screen has been stopped as hereinafter described.

In the arrangement shown, two different driving means are provided for the shaft 97 and the feeding device 98. This plural driving means comprises a clutch disc 102 rigidly mounted upon the shaft 97 between cooperating clutch discs 103 and 104, the former of which is connected with a high speed driving chain 105, and the latter of which is connected with a low speed driving belt 106. The arrangement is such that when the shaft 97 stands in the position as shown in Fig. 10 the clutch disc 102 is adapted to rotate freely between the discs 103 and 104 without driving either of said discs. When the shaft 97 is shifted toward the left in Fig. 10, the clutch disc 102 is brought into operative engagement with the clutch disc 104 so as to cause the shaft to be driven at low speed through the medium of the belt 106 from any suitable source of power. When the shaft 97 is shifted toward the right in said Fig. 10, the clutch disc 102 serves by engagement with the clutch disc 103 to connect the shaft with the high speed driving chain 105 for driving the shaft from any suitable source of power.

The position of the shaft 97 longitudinally thereof is controlled by a lever 107 which is provided with a lug 108 at one face thereof as is best shown in Fig. 11 adapted by engagement with the groove 109 in a drum 110 to move the shaft either toward the right or the left in said Fig. 10 and to hold it in the desired changed position while permitting free rotation of the shaft.

In the arrangement shown, a brake for stopping the rotation of the shaft 97 is provided comprising a head 111 mounted upon the shaft with a brake band 112 extending thereabout and adapted to be tightened in position for stopping the rotation of the head and the shaft by frictional engagement therewith. In the arrangement shown, the brake band 112 is connected with a suitable link 113 at its free end, such link being connected with a lever 114 which is pivotally mounted upon a horizontal axis by means of a bolt 115 at an intermediate point, the opposite end of the lever 114 being connected by means of a link 116 with the end of a lever 117. The arrangement is such that when the lever 117 is moved in clockwise direction about its axis, the lever 114 is moved in counter-clockwise direction (see Fig. 22), serving to exert an upward pull on the link 113 for tightening the brake band 112 about the head 111.

The means for supporting the scoop 13 from the bars 37 and for giving the scoop the required tipping movement for dumping the contents of the scoop into the mixer 14 will now be described. As is shown in Figs. 10 and 30, the scoop 13 is provided at its opposite sides with obliquely disposed blocks 118 connected by spot-welding or in any other suitable manner, the connection of the links 36 with the scoop being effected through the medium of said blocks. The blocks 118 extend a short distance beyond the body of the scoop, the outer ends of the blocks 118 being pivotally connected with short links 119 which in turn are pivotally connected with the lower end portions of the bars 37. The arrangement is such that the weight of the scoop 13 serves to hold the scoop normally in horizontal position as shown in Fig. 29. The scoop 113 is likewise indicated by dotted lines in Fig. 26 indicating the relative position of the scoop even though the scoop is not visible at the line 26—26 of Fig. 10.

The means for moving the scoop into dumping position as shown in Fig. 30 comprises a slide block 120 (see Fig. 34), which is slidably mounted upon a horizontal bar 121 carried by the vertical frame bars 122 by which the hopper 11 is supported. As is clearly shown in Fig. 27, the slide block 120 has a link 123 pivotally connected thereto on the face thereof adjacent to the hopper 11, the opposite end of said link 123 being pivotally connected to an upright lever 124 as is clearly shown in Fig. 1. The arrangement is such that when the lever 124 is swung toward the left in Fig. 1 by the operator, the slide block 120 is moved toward the right in Figs. 26 and 27 and toward the left in Figs. 29 and 34.

On the opposite face of the slide block 120 from that at which the link 123 is connected, we have provided a bracket 125 (see Fig. 27), which is connected at one end with the block 120 and at its opposite end portion stands in spaced relation to the block. As is best shown in Fig. 27, the bracket 125 extends between the scoop 13 and the adjacent link 36, such link 36 being provided with a pin 126 which extends into and through a notch 127 in the lower edge of the outer end portion of the bracket 125 (see Fig. 30). The arrangement is such that upon the initial portion of the movement of the slide block 120 toward the right in Fig. 26 the link 36 is caused to swing toward the right in said figure, or toward the left in Figs. 29 and 34, causing the block 119 to swing also toward the left in said Figs. 29 and 34 and serving to cause a tipping movement of the scoop 13. At an intermediate portion of the movement of the bracket 125 the parts are in substantially the position as shown in Fig. 34, and at substantially the end of the movement of the slide block 120 and bracket 125 toward the left in said figure the parts assume the position as shown in Fig. 30, with the scoop 13 standing in position for completely dumping all contents therefrom. Upon a return movement of the slide block and bracket toward the right in said Figs. 29, 30 and 34, the opposite end of the notch 127 is adapted to engage the pin 126 for swinging the link 36 and the block 119 in the reverse direction for bringing the scoop 13 again to its normal horizontal position as shown in Fig. 29.

The means for controlling and operating the lever 107 for throwing the clutch plate 102 into engagement alternatively with the clutch plates 103 and 104 comprises a magnet 128 fixedly mounted in position between frame bars 129 as is clearly shown in Fig. 10, such magnet being connected by leads 130 with a suitable source of electrical energy and including a mercury switch 131 as shown in Figs. 16, 17 and 18. As is clearly shown in Fig. 16, the mercury switch 131 is mounted substantially opposite the end of the scale bar 39 to which the vertical scoop supporting bars 37 are pivotally connected, being the end of the bar adjacent to the line 16—16 of Fig. 12. The container comprising the body of the switch 131 is carried by a bar 132 at right angles thereto, such bar 132 having a bar 133 rigidly connected therewith in parallelism with said container portion of the switch. The bar 133 is supported by a pin 134 extending from one face of the scale bar 39, and a second pin 135 formed on the end portion of a bar 136 pivotally mounted on the outer face of the scale bar 39. In the arrangement shown, the bar 136 is mounted upon the bar 39 by means of a knife 137 extending from the face of the bar 39 as shown in Figs.

12 and 14 the arrangement being such that the bar 136 is adapted to have a vertical swinging motion freely with respect to the bar 39. The bar 39 is provided with a pin 138 which stands normally in spaced relation above the bar 136 in position to limit clockwise swinging movement of the bar 136 in Fig. 14 with respect to the bar 39. Upon the end of the bar 136 at a point opposite the attachment of the link 48 with the scale bars 39 and 40, we have provided a weight 139, such weight 139 being preferably adjustable longitudinally of the bar 136. A bracket 140 extending from the hopper 11 normally supports the bar 136 and the weight 139 so as to hold the bar 136 in about the position as illustrated in Fig. 15 in spaced relation to the pin 138. The arrangement is such that when the scale bars 39 and 40 are swung upon their pivotal mountings by reason of the feed of retarder to the scoop 13 so as to cause such retarder and scoop to become balanced with respect to the weights 59, shortly after the start of such swinging movement of the bar 39 the pin 138 is brought into contact with the upper edge of the bar 136 serving to apply the weight 139 effectively to the bars 39 and 40 for preventing further swinging movement of the bars 39 and 40 downwardly with the scoop 13, serving to hold the scale bar 39 in the position as shown in Fig. 17.

With the parts in the condition as shown in Fig. 16, with the scoop 13 empty, the bar 133 is supported in oblique position for holding the body of the switch 131 in position for maintaining the circuit 130 open. When, however, the bar 39 is swung downwardly with respect to the bar 136, into the position as shown in Fig. 17, which represents the position of the parts when the downward movement of the bar 39 is stopped through the medium of the weight 139 connected to the bar 39 by the pin 138, the pin 134 is sufficiently lowered with respect to the pin 135 for causing the bar 133 and the switch 131 to swing past the horizontal into oblique position in the opposite direction for closing the circuit 130 and serving thus to energize the magnet 128. Upon such swinging movement of the bar 133, it is brought into contact with a pin 141 which depends from the plate 44, such pin 141 in the arrangement shown serving to cooperate with the pins 134 and 135 for the support of the bar 133 and the switch 131. Upon further downward movement of the bar 39 in the manner hereinafter described, the pins 135 and 134 are moved downwardly together for causing the bar 133 and the switch body 131 again to swing past the horizontal into about the same angular position as that shown in Fig. 16 for bringing the right-hand end of the bar 133 into position upon a pin 142 also depending from the plate 44. Such further downward movement of the bar 39 for bringing the bar 133 into position upon the pins 141 and 142 serves again to open the circuit 130 for deenergizing the magnet 128. A pivoted link 143 is connected with the bar 132 for holding the switch 131 adjustably in the approximate desired position.

As is best shown in Figs. 20 to 23, the magnet 128 is surrounded by a suitable shell type of core 144 serving as a return path for the lines of magnetic force. An armature 145 slidably mounted in a suitable opening in the magnet and core 144 is adapted to be moved upwardly by the force of the magnetism when the circuit through the leads 130 is closed and is adapted to move downwardly to the position as shown in Figs. 20 and 21 when the circuit through said leads 130 is opened.

The magnet 128 is located below a frame bar 146 which in turn is located substantially above the shaft 97, as is indicated in Fig. 10, being supported by the frame bars 129. At an intermediate point, the bar 146 is provided with a notch 147 extending at its greatest depth substantially through the bar 146, the magnet 128 being located in substantially centered position with respect to the notch directly below said bar 146. At opposite sides of the notch 147 there are pivotally mounted two links 148 and 149 which in turn are connected at their opposite ends by means of two other links 150 and 151, the four links in question being pivotally connected with each other in series arrangement so as to enable the end links 148 and 149 to swing about their axes with respect to the bar 146 and so as to permit the intermediate links 150 and 151 to be buckled or straightened with respect to each other between the end links. As is best shown in Figs. 24 and 25, the pivotal connections between the end links and the intermediate links comprise pins or rods 152 and 153, the ends of said rods at each side of the bar 146 being connected together by a coiled spring 154. The arrangement is such that the springs 154 which are indicated diagrammatically by dotted lines in each of Figs. 20 to 23 have a tendency to buckle the intermediate links 150 and 151 with respect to each other into substantially the position as shown in Figs. 20 and 21 as distinguished from the comparatively straightened condition with respect to each other as illustrated in Figs. 22 and 23. The intermediate links 150 and 151 are pivotally connected together by means comprising a pin or bolt 155 to which links 156 and 157 are connected at their upper ends, having their lower ends operatively connected with the armature 145 so as to be free to swing horizontally with respect thereto. The arrangement is such that when the circuit through the leads 130 is open the springs 154 hold the links 150 and 151 in buckled condition with respect to each other. When, however, the circuit through said leads 130 is closed, the armature 145 is drawn upwardly as above suggested serving to straighten the links 150 and 151 more or less completely with respect to each other into the position as shown in Figs. 22 and 23.

Upon the bar 146 at the left of the notch 147 as shown in Fig. 20, we have mounted an arm or lever 158 which is adapted to swing horizontally from the position as shown in Fig. 24 to the position as shown in Fig. 25. When in the position as shown in Fig. 24, the lever 158 engages a stop pin 159 carried by one end of a cross bar 160, and when the lever 158 stands in the alternative position it engages a stop pin 161 mounted upon the opposite end portion of said cross bar 160. A spring 162 indicated diagrammatically is connected with a pin 163 carried by the free end of the lever 158, said spring being connected at its opposite end with a standard 164 at the opposite end portion of the bar 146. The arrangement is such that the spring 162 serves to hold the lever yieldingly in either of the two alternative positions as above suggested, being adapted to pass centers with respect to the axis upon which the lever 158 is mounted in its movement from one position to the other. In the arrangement shown, the arm or lever 158 is carried by a hub portion 165 which is pivotally mounted upon an eccentric pin portion 166 revolubly mounted in a cylindrical bearing 167 carried by the bar 146. At its upper end, the hub portion 165 is provided with an eccentric pin 168 located at the opposite side of the hub portion 165 from that at which the eccentric pin 166 is mounted, such eccentric pin 168 being connected by a link 169 with the pin or rod 153 by which the links 149 and 151 are pivotally connected together as above described. The bearing for the link 169 upon the pin or rod 153 is such that the link 169 is adapted to swing horizontally with respect to the pin 153 to the extent necessary for permitting rotation of the hub portion 165 about the axis of the eccentric pin 166. The arrangement is such that when the lever 158 swings from the position as shown in Fig. 24 to the position as shown in Fig. 25, the link 169 and the pin or rod 153 are moved toward the right in said Figs. 24 and 25, serving to swing the end links 148 and 149 also toward the right from the position as shown in Fig. 20 to the position as shown in Fig. 21. As will be readily understood, when the lever 158 is given a return swinging movement again to the position as shown in Fig. 24, the link 169 and the short end links 148 and 149 are again swung toward the left in said Figs. 20 to 23.

Means is provided for swinging the arm or lever 158 between the limits of its motion as above described, such means comprising a link 170 connected with the pin 163 at the end of said lever 158, such link 170 being connected at its opposite end with a lever 171 pivotally mounted upon the horizontally disposed bar 121 (see Fig. 26). At the end of the link 170 at the left as shown in said Fig. 26, such link is provided with a notch 172 adapted to engage a pin 173 extending from the face of the lever 171, the arrangement being such that when the lever 171 is swung toward the right in Fig. 26 the link 170 is also given a movement toward the right in said figure serving to move the arm or lever 158 against the action of the spring 162 from the position shown in Fig. 24 to the position shown in Fig. 25. Upon a reverse movement of the lever 171 toward the left in said Fig. 26, the arm or lever 158 is moved against the action of the spring 162 from the position as shown in Fig. 25 to the position as shown in Fig. 24. For guiding the lever 171 in its movement, a bar 174 is provided extending between the vertical frame bars 122 adjacent to the hopper 11. The lever 171 is located between the bar 174 and the hopper, and is provided with a tongue 175 which extends over and downwardly opposite the outer face of said bar 174 for guiding the lever in its movement. A link 176 serves to connect the lever 171 at an intermediate point with the lower end of the lever 65 above referred to by which the clutch 63 is thrown into operation. The arrangement is such that when the lever 65 is given a swinging movement for throwing the clutch 63 into operation the lever 171 is moved toward the right in Fig. 26 for moving the arm or lever 158 into the position as shown in Fig. 25 and corresponding to the position of the parts as shown in Fig. 21.

As is clearly shown in Fig. 20, a lever 177 is pivotally mounted upon the bar 146 at the left of the notch 147 in position to be engaged by the pin 155 when the parts are in the position as shown in Fig. 20 in which the springs 154 are holding the intermediate links 150 and 151 buckled with respect to each other and serving thus to hold the pin 155 in its lowered position. The lever 177 has a link 178 pivotally connected with an intermediate portion thereof, such link being connected at its opposite end portion with the flap or gate 101 as shown in Figs. 31 and 32. In the arrangement shown, the connection between the link 178 and the flap 101 is effected by the use of an angle piece 179 secured to the outer face of the flap and having an opening through which the link 178 extends, with a pin 180 extending through an opening in the link 178 for preventing withdrawal of the link. A coiled spring 181 is mounted upon the link 178 above the angle piece 179, bearing at its upper end against a collar 182 fixed on said link. The arrangement is such that upon upward movement of the link 178 the door or flap 101 is moved into its opened position as shown in Fig. 32. Upon subsequent downward movement of the link 178, the flap or door 101 is moved yieldingly into closed position as shown in Fig. 31.

As is shown in Fig. 29, the link 178 at an intermediate point is provided with a bracket 183 fixedly mounted thereon, such bracket at its outer end being connected with a heavy coiled spring 184 which is connected at its opposite end with a bracket 185 connected with one of the vertical frame bars 122, the arrangement being such that the spring 184 normally holds the link 178 in its raised position corresponding to the open position of the gate or flap 101 as shown in Fig. 32. When the lever 177 is held in its lowered position as shown in Fig. 20, the link 178 is then held in its lowered position against the action of the spring 184 serving to hold the gate or flap 101 closed as shown in Fig. 31. When the end links 148 and 149 as shown in Fig. 20 are swung toward the right to the position shown in Fig. 21 at the time when the arm or lever 158 is swung to the position as shown in Fig. 25, the pin or bolt 155 is carried toward the right out of engagement with the lever 177, whereupon the spring 184 serves as above described to raise the link 178 for opening the gate or flap 101, and serving also to move the lever 177 to a raised position as shown in Fig. 21 as compared to the position as shown in Fig. 20.

When the links 148 and 149 are swung toward the right into the position as shown in Fig. 21 by reason of the changed position of the arm or lever 158 as above described, the clutch lever 107 is at the same time swung toward the right through the medium of a link 186 which is pivotally connected at one end with the upper end of the lever 107 and is connected at its opposite end with the pin or rod 152 by which the links 148 and 150 are pivotally connected together. The arrangement is such that upon such movement of the lever 107 toward the right into the position as shown in said Fig. 21 the clutch plate 102 is brought into operative engagement with the clutch plate 103 (see Fig. 10) for connecting the sprocket chain 105 with the shaft 97 for effecting the high speed operation of the feeding device 98 by which retarder is fed to the scoop 13. When sufficient retarder has been delivered to the scoop 13 for counterbalancing the weights 50 as above described, the scale bar 39 is given an initial movement downwardly as shown in Fig. 16 for bringing the parts to the position as shown in Fig. 17 serving to close the circuit through the leads 130 for energizing the magnet 128. The armature 145 is then drawn upwardly serving to straighten the links 150 and 151 more or less completely into the position as shown in Fig. 22. Inasmuch as the link 149 is held rigidly in position by reason of its connection through the link 169 with the pin 168 carried by the arm or lever 158, such upward movement of the pin or bolt 155 serves to swing the end link 148 toward the left from the position as shown in Fig. 21 to the position shown in Fig. 22, serving through the link 186 to return the clutch lever 167 to the position as shown in Fig. 20 corresponding to a neutral position of the clutch plate 162. At the same time, the pin or bolt 155 connecting the intermediate links 150 and 151 presses upwardly on the adjacent end portion of the lever 117 serving to give such lever a clockwise swinging movement as shown in said Fig. 22 for swinging the lever 114 in counter-clockwise direction in said figure for applying the brake band 112 to the head 111 for promptly stopping the rotation of the shaft 97.

Upon the pivot bolt by which the end link 148 is pivotally connected with the frame bar 146, we have pivotally mounted a dog 187 which extends upwardly in diagonal position from its axis and which is provided with an arm 188 extending toward the left in Fig. 20 serving normally to hold the dog in the position as shown in Fig. 20. When the pin or bolt 155 is moved toward the right from the position shown in Fig. 20 to the position shown in Fig. 21, said bolt 155 is brought into engagement with the edge of the dog 187 serving to tip the dog slightly toward the right. When thereafter the pin 155 is moved upwardly as above described by power applied from the magnet 128, the dog is tipped still farther toward the right until the pin 155 passes the upper end of the dog so as to permit the arm 188 to swing the dog in counter-clockwise direction to its normal position as shown in Fig. 20, in which position the dog underlies the pin or bolt 155. In this position, the dog 187 would serve to prevent downward movement of the pin or bolt 155 if the magnet 128 should become deenergized while the parts are in the position as shown in Fig. 22.

Figure 1:
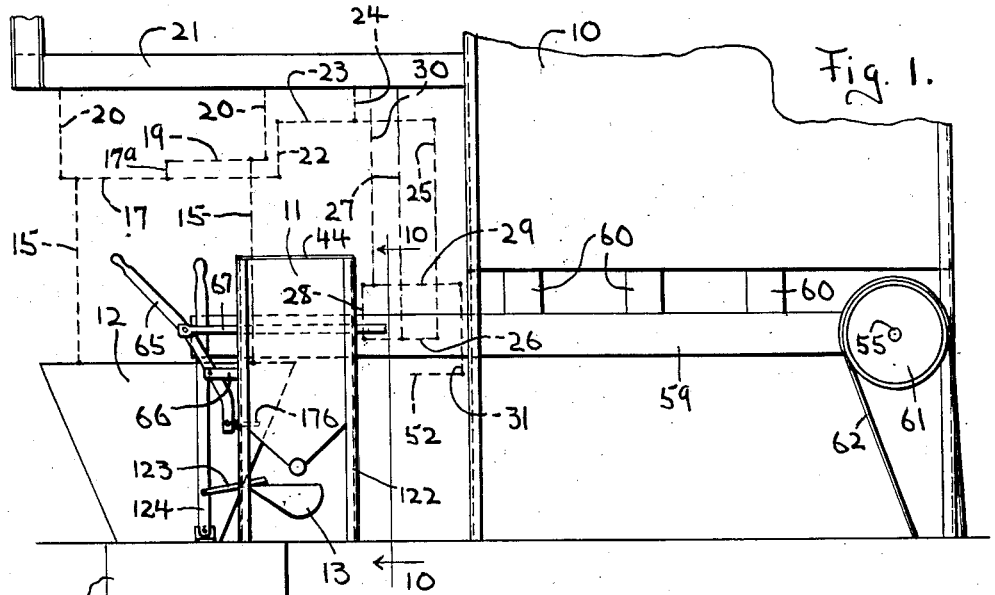
Fig. 1 is a side view of our improved mechanism, showing the general arrangement of the parts, but with many of the operating mechanisms omitted.

The arrangement is such that the parts stand in the positions as shown in Fig. 22 when the high speed retarder clutch has been thrown out of operation and while the stucco clutch 63 is still in operation, the respective feeding devices being so arranged that the normal initial feed of retarder to the scoop 13 is effected before the normal feed of stucco to the hopper 12 is completed. With the parts in the position shown in Fig. 22, when the normal amount of stucco has been delivered to the hopper 12 serving to raise the scale bar 29, the circuit through the leads 94 is closed as above described serving to energize the magnet 78 for releasing the dog 76 followed by the succession of movements of the parts by which the clutch 63 is thrown out of operation as above described. This succession of movements of the various parts by which the clutch 63 is thrown out of operation serves to swing the lever 65 into the position as shown in Fig. 1, and serves thereby to swing the lever 171 toward the left into the position as shown in Fig. 26, serving thereby to apply a pull upon the arm or lever 158 for moving it from the position as shown in Fig. 25 to the position as shown in Fig. 24, serving through the link 169 to move the end link 149 toward the left from the position shown in Fig. 22 to the position shown in Fig. 23. Inasmuch as the magnet 128 is still effective for holding the intermediate links 150 and 151 in their comparatively straightened or aligned positioned with respect to each other, the link 148 is accordingly swung toward the left from the position shown in Fig. 22 to the position shown in Fig. 23, serving through the link 186 to move the lever 107 toward the left from the neutral position as shown in Fig. 22 for operatively engaging the clutch member 102 with the clutch disc 104 of the slow speed driving belt 106.

Upon movement of the links 148 and 149 toward the left from the position shown in Fig. 22 the pin or bolt 155 is moved out of engagement with the lever 117 so as to release the brake band 112 from the head 111 for permitting the shaft 97 to be driven through the medium of the belt 106.

As is set forth above, in many cases the movement of stucco into the hopper 12 along the feeding devices 58 continues in many cases for many seconds after the rotation of such feeding devices 58 has terminated. Under such circumstances, a considerable excess of stucco over the normal 1400 pounds is in many cases delivered to the hopper 12. The arrangement of our improved mechanism is such that normally the amount of retarder delivered to the scoop 13 by the high speed driving means 105 is less than the amount normally desired for the normal 1400 pounds of stucco. It is accordingly necessary that the low speed retarder clutch be kept in operation for a limited time even if no excess stucco is delivered to the hopper 12. The arrangement is such that whether or not excess stucco is delivered to the hopper 12 and without regard as to how much excess stucco is delivered, the slow speed retarder clutch comprising the clutch plates 102 and 104 is kept in operation until the retarder in the scoop 13 is brought into balanced relation with the amount of stucco actually delivered to the hopper 12, such balanced relation being effected through the medium of the link or bar 52 acting against the adjustable fulcrum device 53. With the low speed retarder clutch in operation after the delivery of the complete quota of stucco to the hopper 12, the parts stand in the positions as shown in Fig. 17. When the retarder in the scoop 13 is brought to the predetermined desired weight ratio with respect to the stucco in the hopper 12, the scoop 13 descends, serving to bring the parts to the positions as shown in Fig. 18 for opening the circuit through the leads 130 and deenergizing the magnet 128. The springs 154 then draw the end link 148 toward the end link 149, serving to move the pin or bolt 155 downwardly into the position as shown in Fig. 20. This movement of the link 148 toward the right into the position as shown in Fig. 20 serves through the link 186 to swing the clutch lever 107 to its neutral position for stopping the slow speed drive of the retarder feeding means. At the same time, the lever 177 is swung downwardly from the position as shown in Fig. 23 to the position as shown in Fig. 20, serving to move the link 178 downwardly against the action of the spring 184 for closing the flap or gate 101 for preventing further delivery of retarder to the scoop 13 even though an additional amount of such retarder might escape through the screen 99. Upon the downward movement of the scoop 13 when the amount of retarder therein has reached the desired weight relation with respect to the stucco in the container 12, at which time the scale bar 29 is also drawn downwardly to approximately its central balanced condition through the medium of the bar 52, the switch 92 is swung upon its pivot so as to effect an opening of the circuit through the leads 94, serving to deenergize the magnet 78 for permitting the dog 76 to return to operative holding position as shown in Fig. 4. Prior to such downward movement of the dog 76, the link 74 has been held in its retracted position as shown in Fig. 4 by reason of the connection of the link 74 with the link 67 and the bell crank lever 68 through the link 81 and the pawl 87. The engagement of the pawl 76 with the link 74 is necessary, however, before the lever 65 is again operated for throwing the clutch 63 into operation, since otherwise the clutch would be again thrown out of operation immediately following its movement into operation.

Means is provided for taking the pressure of the weight 139 from the scale bars 39 and 40 for the operation of dumping the contents from the pivotally mounted scoop 13 after the final balancing has been effected, the removal of the weight serving to destroy the balance so as to prevent oscillation of the parts during the dumping operation. This means comprises an arm 189 pivotally mounted upon a cross bar 190 extending between the upright frame bars 122 (see Figs. 26 and 29), the free end of the arm 189 being adapted normally to rest upon the upper edge of the slide block 120. When the slide block 120 is moved toward the left in Fig. 29 for giving the scoop 13 a dumping movement as above described, the slide block 120 is moved from beneath the arm 189 so as to permit the arm to drop into position upon the cross bar 121 as shown in Fig. 34. At an intermediate point, the arm 189 has a link 191 pivotally connected therewith, such link 191 extending partially around the hopper 11 and upwardly along the side of the hopper as is clearly shown in Figs. 10 and 26. At its upper end, said link 191 is pivotally connected with an arm 192 pivotally mounted upon said hopper 11, the arm 192 being provided with a weight 193 upon one end in position to move the arm 192 and the connected link 191 downwardly when the slide block 120 is moved out of engagement with the arm 189. At its opposite end, the arm 192 underlies the end of the arm or lever 136. The arrangement is such that when the arm 189 is resting upon the slide block 120 the arm 192 is held in lowered position with respect to the arm 136 so as to be out of engagement therewith. When, however, the link 191 is moved downwardly in connection with a dumping operation the arm 192 is swung counter-clockwise in Fig. 10 into engagement with the arm 136. The arrangement is such that upon such swinging movement of the arm 192 the arm 136 is moved upwardly out of engagement with the bracket 140, serving by such movement to carry the arm out of engagement with the pin 138, serving thus effectively to disconnect the weight 139 from the scale bars 39 and 40.

As has already been explained, when retarder is being fed to the scoop 13 through the medium of the high speed driving means for the feeding mechanism the weight 139 is supported by the bracket 140 out of operative engagement with the scale bar 39, such weight 139 serving to stop the swinging movement of the scale bar 39 shortly after the initial movement thereof. During the feed of the retarder to the scoop 13 through the medium of the low speed driving means for the feeding mechanism, the weight 139 is supported largely by the bracket 140, but the arrangement is such that the scale bar 39 cannot be drawn downwardly into fully balanced position with respect to the stucco in the hopper 12 without raising the weight 139 from the bracket 140. The arrangement is such that the scale bars for both the stucco and the retarder are adapted to stand in their central balancing position when the weight 139 is effectively connected with the scale bar 39, and the counterbalancing system is regulated for obtaining accurate proportioning of the parts upon this basis. When the slide block 120 is moved toward the left in Fig. 29, however, for dumping the retarder from the scoop 13, the weight 139 is disconnected from the scale beam 39 so as to cause the scoop 13 and its connected parts to stand slightly below the central balanced position when in condition for dumping.

Means is provided for preventing the operation of the dumping means for the scoop 13 except when the scoop 13 stands at substantially the central balancing position, or very slightly below such central position as above suggested. This means comprises a dog 194 which is normally supported in position opposite the slide block 120 as shown in Fig. 29 for preventing movement of the slide block toward the left in said figure. During the time when the lever 177 stands in its raised position as shown in Figs. 21, 22 and 23 corresponding to the position of the flap or gate 101 as shown in Fig. 32, the dog 194 is supported in the position as shown in Fig. 29 by means of a short rod 195 which extends through the dog 194 and through the bracket 183 carried by the link 178. When the lever 177 is moved downwardly by engagement of the pin or bolt 155 therewith as shown in Fig. 20, the link 178 is moved downwardly against the action of the spring 184 into the position as shown in Fig. 29 in which the support for the dog 194 by the rod 195 is withdrawn. When the rod 195 is moved downwardly with the link 178, the dog 194 is then supported by an arm 196 which is pivotally mounted upon a link 197 connecting the vertical supporting bar 37 with the vertical frame bar 122. As will be appreciated from the description above, the lever 177 and the link 178 are given a downward movement only when a balance has been established between the scoop 13 and the hopper 12. The rod 195 and the link 178 accordingly support the dog 194 during the balancing operation. The arrangement is such that when the scoop 13 is in balanced condition with respect to the hopper 12 the parts stand in the position as shown in Fig. 34 with the arm 196 at a sufficiently lowered position for permitting the slide block 120 to move toward the left into a position as shown in Fig. 34 opposite the dog 194. If for any reason the magnet 128 might be deenergized before a balance is established between the scoop 13 and the hopper 12, and the lever 177 should accordingly be moved downwardly for applying the weight of the dog 194 to the arm 196 before such balance had been established, the dog 194 would then be held by the arm 196 in position opposite the slide block 120 so as to prevent movement of the block toward the left in Figs. 29 and 34.

Means is also provided for preventing operation of the dumping mechanism in case an excessive amount of retarder should be fed to the scoop 13. This means comprises a bolt 198 pivotally mounted upon the vertical bar 37 so as just to clear the slide block 120 when the slide block is in normal position as shown in Fig. 29. The bolt 198 is arranged in such position as to clear the side block 120 vertically when the scoop 13 and the supporting bars 37 are in substantially balanced condition with respect to the hopper 12 but so as to extend opposite the slide block 120 so as to prevent movement of the block toward the left in Fig. 29 when and if the scoop 13 should move any substantial distance below its central balancing position. A bracket 199 is mounted upon the frame bar 190 in position to support the bolt 198 and to prevent any substantial swinging of the bolt toward the left in said Fig. 29.

In operation, power is to be applied continuously to the pulley 61 through the belt 62 and the hoppers 10 and 11 are preferably to be kept fairly well filled. With the parts in the positions as shown in Fig. 20, upon a stroke of the lever 65 in clockwise direction in Fig. 1, the clutch 63 is thrown into operation for driving the stucco delivering devices 58 and for shifting the arm 158 from the position shown in Fig. 24 to the position shown in Fig. 25, serving through the links 169 and 186 to move the clutch member 102 toward the right in Fig. 10 for throwing the high speed driving means for the retarder delivery mechanism into operation, the parts assuming the positions as shown in Fig. 21. When a certain predetermined amount of retarder has been delivered to the scoop 13, the parts move from the positions shown in Fig. 16 to the positions shown in Fig. 17, serving to close the mercury switch 131 for energizing the magnet 128 which promptly moves the parts to the positions as shown in Fig. 22, serving to move the clutch member 102 toward the left in Fig. 10 out of engagement with the clutch member 103 and serving through the link 117 to tighten the brake band 112 upon the head 111 for stopping the high speed delivery of retarder, the parts moving to the positions as shown in Fig. 22.

When the predetermined desired amount of stucco has been delivered to the hopper 12, the scale bar 29 rises to the position as shown in Fig. 3, closing the mercury switch 92 for energizing the magnet 78 and raising the dog 76 for permitting the link 74 to move toward the right in Fig. 4 for causing the readjustment of the parts to the positions as shown in Fig. 9, whereupon the cam 72 upon its next following revolution moves the arm 71 toward the left, carrying the bar 80 and the link 81 also toward the left for swinging the lever 68 in counter-clockwise direction in Fig. 6 for throwing the clutch 63 out of operation for stopping the rotation of the stucco delivering devices 58. This counter-clockwise swinging movement of the lever 68 carries the link 67 toward the left in Fig. 6, serving to swing the lever 65 in counter-clockwise direction into the position as shown in Fig. 1 whereby the link 176 is moved toward the right in said Fig. 1 (toward the left in Fig. 26). This serves through the lever 171 and the link 170 to swing the arm 158 from the position shown in Fig. 25 to the position shown in Fig. 24, serving to carry the parts to the positions as shown in Fig. 23 by which movement the clutch member 102 is carried by the link 186 into engagement with the low speed driving clutch member 104 for initiating further delivery of retarder to the scoop 13.

When the weight of the retarder in the scoop 13 reaches the predetermined desired maximum, the parts move from the positions as shown in Fig. 17 to the positions shown in Fig. 18, serving to open the switch 130 for deenergizing the magnet 128 so as to permit the springs 154 to move the parts to the positions as shown in Fig. 20, serving through the link 186 to move the clutch member 102 again to neutral position as shown in Fig. 10. The downward movement of the pin or bolt 155 to the position as shown in Fig. 20 depresses the lever 177 for closing the flap or gate 101 and permitting the rod 195 to descend to the position as shown in Fig. 29 for transferring the weight of the dog 194 to the pivoted bar 196 which is movable vertically with the scoop 13.

The lever 124 is then to be given a stroke toward the left in Fig. 1 by the operator for moving the slide block 120 toward the left in Fig. 29 for effecting a dumping movement of the scoop 13. At the start of such movement of the slide block 120, the arm 189 descends, permitting the weight 193 to raise the weight 139 for causing the desired unbalanced condition of the scoop 13 and its contents so as to prevent undesired movements of the mercury switch 131 which would be incident to oscillation of the scale bars 39 and 40. At the end of the movement of the slide block 120 toward the left in Figs. 29 and 34, the parts assume the positions as shown in Fig. 30, for causing the contents of the scoop to fall into the mixer 14. The lever 124 is then to be moved again toward the right into the position shown in Fig. 1, and the contents are to be dumped in any approved manner from the hopper 12, whereupon the parts are in position for another cycle of operations.

By the use of our improved arrangement, we are assured that amounts of stucco and retarder having the desired weight relation are delivered to the containers 12 and 13, and are assured in any event that the desired ratio of weights is attained before a dumping operation of the retarder is effected since the dumping apparatus cannot be operated until the desired balance is brought about, the weight ratio being established by the proper setting of the fulcrum device 53 by which the relative effective lengths of the respective end portions of the bar 52 at opposite sides of the fulcrum device 53 are controlled. The weights 59 and 33 are preferably to be varied to correspond to the weight ratio desired in order to control the points at which the high speed retarder clutch and the stucco clutch are thrown out of operation.

While we prefer to employ the form of apparatus as shown in our drawings and as above described, it is to be understood that we do not limit our invention to the form shown except so far as the claims may be so limited by the prior art, it being understood that changes might well be made in the form and arrangement without departing from the spirit of our invention.

We claim:—

1. In a mechanism of the type described, the combination of two containers, means for supporting said containers and connecting them together adapted to cause said containers to have vertical movement with respect to each other when the ratio of the weight of the materials in one container to the weight of the materials in the other container passes a predetermined critical value, feeding means for each of said containers adapted upon operation to deliver materials to said container, means actuated by a downward movement of one of said containers for automatically stopping the operation of the feeding means for said container when the weight of the materials in said container reaches a predetermined maximum, and means adapted upon a relative vertical movement of said containers for automatically stopping the operation of the feeding means for the other container when the ratio of the weights of the materials in the respective containers reaches said predetermined critical value.

2. In a mechanism of the type described, the combination of two containers, means for supporting said containers and connecting them together adapted to cause said containers to have vertical movement with respect to each other when the ratio of the weight of the materials in one container to the weight of the materials in the other container passes a predetermined critical value, feeding means for each of said containers adapted upon operation to deliver materials to said container, means actuated by a downward movement of one of said containers for automatically stopping the operation of the feeding means for said container when the weight of the materials in said container reaches a predetermined maximum, means actuated by the relative movement of said containers for automatically stopping the operation of the feeding means for the other container when the ratio of weights of the materials in the respective containers reaches said predetermined critical value, and means for preventing the delivery of materials by the feeding means for said other container after said feeding means has been thrown out of operation.

3. In a mechanism of the type described, the combination of two containers, means for supporting said containers and connecting them together adapted to cause said containers to have vertical movement with respect to each other when the ratio of the weight of the materials in one container to the weight of the materials in the other container passes a predetermined critical value, feeding means for each of said containers adapted upon operation to deliver materials to said container, means for stopping the operation of the feeding means for one of said containers when the weight of the materials in said container reaches a predetermined maximum, means for stopping the operation of the feeding means for the other container when the weight of the materials in said other container reaches a predetermined maximum, means for starting the operation of the feeding means for said other container at a comparatively slower speed when the operation of the feeding means for said one container is stopped, and means for again stopping the operation of the feeding means for said other container when the ratio of the weights of the materials in the respective containers reaches said predetermined critical value.

4. In a mechanism of the type described, the combination of two containers, means for supporting said containers and connecting them together adapted to cause said containers to have vertical movement with respect to each other when the ratio of the weight of the materials in one container to the weight of the materials in the other container passes a predetermined critical value, feeding means for each of said containers adapted upon operation to deliver materials to said container, means for stopping the operation of the feeding means for one of said containers when the weight of the materials in said container reaches a predetermined maximum, means for stopping the operation of the feeding means for the other container when the weight of the materials in said other container reaches a predetermined maximum, means for starting the operation of the feeding means for said other container at a comparatively slower speed when the operation of the feeding means for said one container is stopped, means for again stopping the operation of the feeding means for said other container when the ratio of the weights of the materials in the respective containers reaches said predetermined critical value, and means for preventing the delivery of materials by the feeding means for said other container after said feeding means has been thrown out of operation.

5. In a mechanism of the type described, the combination of two containers, scale beams in counterbalancing relationship to said containers respectively, operative connections between said scale beams adapted to prevent one of said scale beams from rising substantially above its central balanced position while the other scale beam is standing approximately at or above its central balanced position, feeding means for each of said containers adapted upon operation to deliver materials to said container, means adapted upon the upward movement of the scale beam for one of said containers for automatically stopping the operation of the feeding means for said container when the materials in said container are balanced with respect to said scale beam, and means adapted upon the upward movement of the scale beam for the other container for automatically stopping the operation of the feeding means for said other container when the ratio of weights of the materials in the respective containers reaches a predetermined critical value.

6. In a mechanism of the type described, the combination of two scale mechanisms each comprising a container for the materials to be weighed and each having a depending link for detachable connection of graduated weights thereto, a substantially horizontal bar pivotally connected between said links, a fulcrum device mounted above said bar and adjustable therealong in position to engage said bar so as to prevent either one of said links from rising substantially above its central balanced position while the other link is standing substantially at or above its central balanced position, feeding means for each of said containers adapted upon operation to deliver materials to said container, means actuated by downward movement of one of said containers for automatically stopping the operation of the feeding means for said container when the weight of the materials in said container reaches a predetermined maximum, and means actuated by the upward movement of the scale beam for the other container for automatically stopping the operation of the feeding means for said other container when the materials in said other container become balanced through said bar with the materials in said one container.

7. In a mechanism of the type described, the combination of two containers, scale beams in counter-balancing relationship to said containers respectively, operative connections between said scale beams adapted to prevent one of said scale beams from rising substantially above its central balanced position while the other scale beam is standing approximately at or above its central balanced position, feeding means for each of said containers adapted upon operation to deliver materials to said container, means for stopping the operation of the feeding means for one of said containers when the materials therein are balanced with respect to said scale beam, a mercury switch carried by the scale beam for the other one of said containers, means adapted upon an upward movement of said scale beam to give said mercury switch an angular swinging movement, and means adapted upon such swinging movement of said switch for throwing the feeding means for said other container out of operation.

8. In a mechanism of the type described, the combination of two containers, means for supporting said containers and connecting them together adapted to cause said containers to have vertical movement with respect to each other when the ratio of the weight of the materials in one container to the weight of the materials in the other container passes a predetermined critical value, feeding means for each of said containers adapted upon operation to deliver materials to said container, means adapted by an operative stroke to empty one of said containers, and means for preventing the operation of said container emptying means when said container stands substantially above or substantially below its central balanced position with respect to the other container.

9. In a mechanism of the type described, the combination of two containers, means for supporting said containers and connecting them together adapted to cause said containers to have vertical movement with respect to each other when the ratio of the weight of the materials in one container to the weight of the materials in the other container passes a predetermined critical value, feeding means for each of said containers adapted upon operation to deliver materials to said container, a slide block adapted by an operative stroke in one direction to empty one of said containers, and stops movable vertically with said container adapted by engagement with said slide block to prevent an operative stroke of said block when said container stands substantially above or substantially below its central balanced position with respect to the other container.

10. In a mechanism of the type described, the combination of two containers, means for supporting said containers and connecting them together adapted to cause said containers to have vertical movement with respect to each other when the ratio of the weight of the materials in one container to the weight of the materials in the other container passes a predetermined critical value, feeding means for each of said containers adapted upon operation to deliver materials to said containers, means adapted by an operative stroke to empty one of said containers, a pawl pivotally mounted on a fixed axis adjacent to said container, means adapted by cooperation with said pawl when the pawl is in operative position to prevent operation of said container emptying means, yielding means adapted normally to support said pawl in its operative position, and means actuated automatically by a relative vertical movement of said containers when the desired weight ratio has been established to move said pawl supporting means out of operative supporting position.

11. In a mechanism of the type described, the combination of two containers, means for supporting said containers and connecting them together adapted to cause said containers to have vertical movement with respect to each other when the ratio of the weight of the materials in one container to the weight of the materials in the other container passes a predetermined critical value, feeding means for each of said containers adapted upon operation to deliver materials to said container, means adapted by an operative stroke to empty one of said containers, a pawl pivotally mounted on a fixed axis adjacent to said container, means adapted by cooperation with said pawl when the pawl is in operative position to prevent operation of said container emptying means, yielding means adapted normally to support said pawl in its operative position, means actuated automatically by a relative vertical movement of said containers when the desired weight ratio has been established to move said pawl supporting means out of operative supporting position, and yielding means carried by said container and movable vertically with the container for supporting said pawl when said first named yielding means is moved out of supporting position, said last named yielding means being adapted to hold said pawl in position to prevent operation of the container emptying means until said container is moved vertically to substantially its central balanced position upon the establishment of said predetermined weight ratio.

12. In a mechanism of the type described, the combination of two containers, means for supporting said containers and connecting them together adapted to cause said containers to have vertical movement with respect to each other when the ratio of the weight of the materials in one container to the weight of the materials in the other container passes a predetermined critical value, feeding means for each of said containers adapted upon operation to deliver materials to said container, means adapted by an operative stroke to empty one of said containers, a pawl pivotally mounted on a fixed axis adjacent to said container, means adapted by cooperation with said pawl when the pawl is in operative position to prevent operation of said container emptying means, yielding means adapted normally to support said pawl in its operative position, means actuated automatically by a relative vertical movement of said containers when the desired weight ratio has been established to move said pawl supporting means out of operative supporting position, and an arm pivotally mounted at an intermediate point on said container assembly so as to have vertical movement bodily with said container adapted yieldingly to support said pawl when said first named yielding means is moved out of supporting position.

13. In a mechanism of the type described, the combination of a scale beam, a container supported by said beam and movable vertically therewith, means for feeding materials to said container, a horizontally disposed bar pivotally mounted on said scale beam, a weight on said bar at the end portion thereof opposite that at which said container is connected with said beam, means adapted normally to support said weight independently of said beam while the container stands in its raised position, means adapted shortly after the start of the downward movement of the container to connect said weight effectively with said beam for opposing further downward movement of the container, and means actuated by said initial downward movement of the container to throw said feeding means out of operation.

14. In a mechanism of the type described, the combination of a scale beam, a container supported by said beam and movable vertically therewith, means for feeding materials to said container, a horizontally disposed bar pivotally mounted on said scale beam, a weight on said bar at the end portion thereof opposite that at which said container is connected with said beam, means adapted normally to support said weight independently of said beam while the container stands in its raised position, means adapted shortly after the start of the balancing downward movement of the container to connect said weight effectively with said beam for opposing further downward movement of the container, means actuated by said initial downward movement of the container to throw said feeding means out of operation, cooperating means adapted thereafter to throw said feeding means again into operation, and means actuated by further downward movement of the container against the action of said weight again to throw said feeding means out of operation.

15. In a mechanism of the type described, the combination of a scale beam, a container supported by said beam and movable vertically therewith, means for feeding materials to said container, a horizontally disposed bar pivotally mounted on said scale beam, a weight on said bar at the end portion thereof opposite that at which said container is connected with said beam, means adapted normally to support said weight independently of said beam while the container stands in its raised position, means adapted shortly after the start of the balancing downward movement of the container to connect said weight effectively with said beam for opposing further downward movement of the container, means actuated by said initial downward movement of the container to throw said feeding means out of operation, cooperating means adapted thereafter to throw said feeding means again into operation, means actuated by further downward movement of the container against the action of said weight again to throw said feeding means out of operation, means adapted by an operative stroke in one direction to empty said container, and means adapted upon the initial portion of the operative stroke of said emptying means to lift said weight out of effective engagement with said beam whereby the container shall be thrown out of its balanced condition and assured against upward movement.

16. In a mechanism of the type described, the combination of a scale beam, a container supported by said beam and movable vertically therewith, means for feeding materials to said container, a horizontally disposed bar pivotally mounted on said scale beam, a weight on said bar at the end portion thereof opposite that at which said container is connected with said beam, means adapted normally to support said weight independently of said beam while the container stands in its raised position, means adapted shortly after the start of the balancing downward movement of the container to connect said weight effectively with said beam for opposing further downward movement of the container, means actuated by said initial downward movement of the container to throw said feeding means out of operation, cooperating means adapted thereafter to throw said feeding means again into operation, means actuated by further downward movement of the container against the action of said weight again to throw said feeding means out of operation, means comprising a slide block adapted by an operative stroke in one direction to empty said container, and means comprising a second weight movably mounted adjacent to said beam and normally held by said slide block out of operation but adapted at the initial portion of the movement of said slide block to move said horizontally disposed bar upwardly for supporting said first named weight free from said scale beam for throwing the container out of its balanced condition.

17. In a mechanism of the type described, the combination of two containers, means comprising a train of levers supporting said containers and connecting them together adapted to cause said containers to have vertical movement with respect to each other when the ratio of the weight of the materials in one container to the weight of the materials in the other container passes a predetermined critical value, a drive shaft, means comprising a clutch mounted on said shaft adapted when in operation to feed materials into one of said containers, means including a link movable toward and from the shaft for throwing said clutch into and out of operation, an arm pivotally mounted so as to swing toward and from the shaft, a pawl on said arm adapted to stand out of operative engagement with said link when the arm is at the limit of its motion away from the shaft but adapted to have operative engagement with the link for moving the link in the direction away from the shaft when the arm stands at the limit of its motion toward the shaft, means on said shaft adapted by engagement with said arm to swing the arm away from the shaft, latch means for holding said arm releasably at the limit of its movement away from the shaft, means for feeding materials to the other one of said containers, means adapted when the materials in said other container reach said predetermined weight ratio with respect to the materials in said one container to release said latch means, and yielding means adapted when said latch means is released to move said arm toward the shaft for engagement through the pawl with the link and consequent movement of the clutch out of operation.

18. In a mechanism of the type described, the combination of two containers, means comprising a train of levers supporting said containers and connecting them together adapted to cause said containers to have vertical movement with respect to each other when the ratio of the weight of the materials in one container to the weight of the materials in the other container passes a predetermined critical value, a drive shaft, means comprising a clutch mounted on said shaft adapted when in operation to feed materials into one of said containers, means including a link movable toward and from the shaft for throwing said clutch into and out of operation, an arm pivotally mounted so as to swing toward and from the shaft, a pawl on said arm adapted to stand out of operative engagement with said link when the arm is at the limit of its motion away from the shaft but adapted to have operative engagement with the link for moving the link in the direction away from the shaft when the arm stands at the limit of its motion toward the shaft, means on said shaft adapted by engagement with said arm to swing the arm away from the shaft, latch means for holding said arm releasably at the limit of its movement away from the shaft, means for feeding materials to the other one of said containers, a spring having effective bearings on said arm and said link tending to press said link away from the shaft when said arm stands at the limit of its movement away from the shaft and tending to press said arm toward the shaft when the link stands at the limit of its movement toward the shaft, and electrically operated means adapted when the materials in said other container reach said predetermined weight ratio with respect to the materials in said one container to release said latch means.

19. In a mechanism of the type described, the combination of two containers, means for feeding materials to one of said containers comprising a clutch, means comprising a horizontally swinging lever for throwing said clutch into operation upon movement in one direction and arranged to be given a movement in the opposite direction when said clutch is thrown out of operation, means for feeding materials to the other container, means comprising a clutch for driving said second feeding means at high speed, means comprising another clutch for driving said second feeding means at low speed, four links connected together in series, connections between said links and said lever adapted to swing the end links of the series in unison when said lever is swung in the direction for throwing said first named clutch into operation, means adapted upon such swinging movement of the end links to throw said high speed clutch into operation for feeding materials into said other container, means adapted when the weight of the materials in said other container reaches a predetermined maximum to swing the intermediate links toward alignment with each other, means adapted upon such straightening movement of said links to throw said high speed clutch out of operation, means adapted when the weight of the materials in said one container reaches a predetermined maximum to throw said first named clutch out of operation and serving thus to give said lever a swinging movement for swinging the end links in the reverse direction, means adapted upon such reverse swinging movement of said end links to throw said low speed clutch into operation, and means adapted when the weight of the materials in said other container reaches a predetermined maximum to buckle the intermediate links for throwing said low speed clutch again out of operation.

20. In a mechanism of the type described, the combination of, two containers of different capacity, the smaller one of said containers being pivotally mounted for dumping, means for emptying said containers comprising a lever for tipping said pivotally mounted container into dumping position, means for feeding materials to the larger container comprising a clutch, operating means adapted upon movement in one direction to throw said clutch into operation and arranged to be moved in the opposite direction when said clutch is thrown out of operation, a second lever operatively connected with said operating means for actuation thereby, a spring for holding said second lever yieldingly at the end of its movement in one direction and adapted to pass centers upon an operative movement of the lever for holding the lever yieldingly at the end of its movement in the opposite direction, means for feeding materials to the smaller container, means comprising a clutch for driving said second feeding means at high speed, means comprising another clutch for driving said second feeding means at low speed, four links pivotally connected together in series, connections between said links and said second lever adapted to swing the end links of the series in unison when said lever is swung in the direction for throwing said first named clutch into operation, means adapted upon such swinging movement of the end links to throw said high speed clutch into operation for feeding materials into said smaller container, electrically operated means comprising a mercury switch and a magnet adapted when the weight of the materials in said smaller container reaches a certain predetermined maximum to swing the intermediate links toward alignment with each other, means adapted upon such straightening movement of said links to throw said high speed clutch out of operation, electrically operated means comprising a second mercury switch and magnet adapted when the weight of the materials in the larger container reaches a predetermined maximum to throw said first named clutch out of operation and serving thus to give said second lever a swinging movement for swinging the end links in the reverse direction, means adapted upon such reverse swinging movement of said end links to throw said low speed clutch into operation, and means comprising a spring operating against said first named mercury switch and magnet adapted when the weight of the materials in said smaller container reaches a predetermined maximum to buckle the intermediate links for throwing said low speed clutch out of operation.

21. In a mechanism of the type described, the combination of two containers, scale beams in counter-balancing relationship to said containers respectively, operative connections between said scale beams adapted to prevent one of said scale beams from rising substantially above its central balanced position while the other scale beam is standing approximately at or above its central balanced position, feeding means for each of said containers adapted upon operation to deliver materials to said container, means for stopping the operation of the feeding means for one of said containers when the materials therein are balanced with respect to said scale beam, a mercury switch carried by the scale beam for the other one of said containers, means adapted upon a partial upward stroke of said scale beam to give said mercury switch an angular swinging movement, means adapted upon such swinging movement of the switch to throw the feeding means for said other container out of operation, means operative while said scale beam stands in partially raised position for throwing said feeding means for said other container again into operation, means adapted upon a further upward movement of said scale beam to give said mercury switch a reverse swinging movement, and means adapted upon such reverse swinging movement of the switch to throw said feeding means again out of operation.

22. In a mechanism of the type described, the combination of two containers, scale beams in counter-balancing relationship to said containers respectively, operative connections between said scale beams adapted to prevent one of said scale beams from rising substantially above its central balanced position while the other scale beam is standing approximately at or above its central balanced position, feeding means for each of said containers adapted upon operation to deliver materials to said container, means for stopping the operation of the feeding means for one of said containers when the materials therein are balanced with respect to said scale beam, a mercury switch carried by the scale beam for the other one of said containers, means adapted upon a partial upward stroke of said scale beam to give said mercury switch an angular swinging movement, means adapted upon such swinging movement of the switch to throw the feeding means for said other container out of operation, means adapted automatically to apply a weight effectively to said scale beam for stopping the upward movement of the beam at an intermediate point in its upward swinging movement, means operative while said scale beam stands in said intermediate position for throwing said feeding means for said other container again into operation, means adapted upon a further upward movement of said scale beam to give said mercury switch a reverse swinging movement, and means adapted upon such reverse swinging movement of the switch to throw said feeding means again out of operation.

DOUGLAS C. JEFFREY.
HENRY J. WOLFE.